(12) United States Patent
Uchikawa

(10) Patent No.: US 8,270,001 B2
(45) Date of Patent: Sep. 18, 2012

(54) PRINTING APPARATUS AND CANCELING METHOD

(75) Inventor: Shinichi Uchikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 979 days.

(21) Appl. No.: 10/826,806

(22) Filed: Apr. 15, 2004

(65) Prior Publication Data

US 2004/0227972 A1   Nov. 18, 2004

(30) Foreign Application Priority Data

May 14, 2003   (JP) ................... 2003/136143

(51) Int. Cl.
*G06F 15/00*   (2006.01)
*G06F 3/12*   (2006.01)
*G06F 3/00*   (2006.01)
*G06K 15/00*   (2006.01)
*G03G 15/00*   (2006.01)
*B41J 29/393*   (2006.01)

(52) U.S. Cl. ............ 358/1.15; 358/1.14; 358/1.13; 358/1.18; 358/1.17; 399/85; 710/16; 347/19

(58) Field of Classification Search ............... 358/1.15, 358/515, 1.14, 1.18, 402, 1.13, 1.17; 707/1, 707/205; 717/124; 370/452; 399/85; 710/16; 347/19
See application file for complete search history.

(56) References Cited

U.S. PATENT DOCUMENTS

| | | | | |
|---|---|---|---|---|
| 5,014,192 A * | 5/1991 | Mansfield et al. | ............ | 370/452 |
| 5,625,757 A * | 4/1997 | Kageyama et al. | .......... | 358/1.14 |
| 5,706,412 A * | 1/1998 | Kojo | ............ | 358/1.14 |
| 5,812,278 A * | 9/1998 | Toyoda et al. | ............ | 358/402 |
| 6,052,204 A * | 4/2000 | Mori et al. | ............ | 358/296 |
| 6,181,436 B1 * | 1/2001 | Kurachi | ............ | 358/1.15 |
| 6,396,592 B1 * | 5/2002 | Okada et al. | ............ | 358/1.15 |
| 6,633,395 B1 * | 10/2003 | Tuchitoi et al. | ............ | 358/1.14 |
| 6,694,509 B1 * | 2/2004 | Stoval et al. | ............ | 707/205 |
| 6,701,845 B2 * | 3/2004 | Ohmura | ............ | 101/484 |
| 7,050,186 B1 * | 5/2006 | Noda | ............ | 358/1.15 |
| 7,148,985 B2 * | 12/2006 | Christodoulou et al. | ... | 358/1.15 |
| 7,190,878 B2 | 3/2007 | Bolduc | | |
| 7,242,488 B2 * | 7/2007 | Matsueda | ............ | 358/1.14 |
| 7,317,545 B2 * | 1/2008 | Tamura | ............ | 358/1.13 |
| 7,359,075 B2 * | 4/2008 | Kimura | ............ | 358/1.15 |
| 7,602,512 B2 * | 10/2009 | Matsueda | ............ | 358/1.15 |
| 2002/0063896 A1 * | 5/2002 | Rogalski et al. | ............ | 358/1.18 |
| 2002/0186400 A1 * | 12/2002 | Matsueda | ............ | 358/1.14 |
| 2003/0007178 A1 * | 1/2003 | Jeyachandran et al. | ...... | 358/1.15 |
| 2003/0053109 A1 * | 3/2003 | Lester et al. | | |
| 2003/0081238 A1 * | 5/2003 | Lester et al. | ............ | 358/1.14 |

(Continued)

FOREIGN PATENT DOCUMENTS

JP   2000-311069   11/2000

(Continued)

*Primary Examiner* — Akwasi M Sarpong

(74) *Attorney, Agent, or Firm* — Canon USA, Inc., IP Division

(57) ABSTRACT

A printing apparatus that has received a request for canceling a print job determines whether the print job can be canceled, and transmits the determined result to a user of a print service before the print job is canceled. The print job is canceled in a process other than the process that has received the request for canceling the print job. After the print job has been canceled, the printing apparatus notifies a predetermined destination of the completion of canceling the print job.

9 Claims, 15 Drawing Sheets

U.S. PATENT DOCUMENTS

| | | | | |
|---|---|---|---|---|
| 2003/0107761 A1* | 6/2003 | Kimura | | 358/1.15 |
| 2003/0197888 A1* | 10/2003 | Kondo | | 358/1.15 |
| 2003/0214667 A1* | 11/2003 | Ishikura et al. | | 358/1.13 |
| 2004/0145772 A1* | 7/2004 | Stringham | | 358/1.15 |
| 2004/0160623 A1* | 8/2004 | Strittmatter et al. | | 358/1.15 |
| 2005/0190395 A1* | 9/2005 | Aritomi | | 358/1.13 |

FOREIGN PATENT DOCUMENTS

| | | |
|---|---|---|
| JP | 2002-366317 A | 12/2002 |
| JP | 2002-366810 A | 12/2002 |

* cited by examiner

FIG. 4

```
<env:Envelope xmlns:env="http://www.w3.org/2001/12/soap-envelope"
env:encodingStyle="http://www.w3.org/2001/12/soap-encoding"
xmlns:enc="http://www.w3.org/2001/12/soap-encoding">
<env:Body>
<bm:create_job xmlns:bm="urn:schemas-bmlinks-jp:service:bmlinks-1-2">
<requesting-user-name>user1</requesting-user-name>
<job-instruction>
<job-instruction-params>
<job-name>sample-job</job-name>
<optional-attributes-fidelity>false</optional-attributes-fidelity>
<copies>1</copies>
<sides>two-sided-long-edge</sides>
<finishings enc:arrayType="bm:Finishing[1]">
<finishing>staple</finishing>
</finishings>
<document-format>image/tiff</document-format>
</job-instruction-params>
<notification-instruction>
<notification-recipient>http://192.168.1.5/event</notification-recipient>
<events enc:arrayType="bm:Event[2]">
<event>job-completed</event>
<event>job-canceled</event>
</events>
</notification-instruction>
</job-instruction>
</bm:create_job>
</env:Body>
</env:Envelope>
```

FIG. 5

```
<env:Envelope xmlns:env="http://www.w3.org/2001/12/soap-envelope"
env:encodingStyle="http://www.w3.org/2001/12/soap-encoding"
xmlns:enc="http://www.w3.org/2001/12/soap-encoding">
  <env:Body>
    <bm:create_jobResponse xmlns:bm=" urn:schemas-bmlinks-jp:service:bmlinks-1-2">
      <result-code>ok</result-code>
      <job-id>1</job-id>
      <notification-subscription-id>1</notification-subscription-id>
      <data-sink-uri>
         http://192.168.1.4/job001
      </data-sink-uri>
    </bm:create_jobResponse>
  </env:Body>
</env:Envelope>
```

FIG. 6

POST /job001 HTTP/1.1
Host: XXXX-Printer
Content-Length: nnn (...data...)

FIG. 7

HTTP/1.1 200 OK
Connection: close

FIG. 8

```
<env:Envelope xmlns:env="http://www.w3.org/2001/12/soap-envelope"
env:encodingStyle="http://www.w3.org/2001/12/soap-encoding"
xmlns:enc="http://www.w3.org/2001/12/soap-encoding">
 <env:Body>
  <env: Fault>
   <faultcode>env:Sender</faultcode>
   <faultstring>Sender Error</faultstring>
   <detail>
    <bm:fault-information xmlns:bm=" urn:schemas-bmlinks-bmlinks-jp:service:bmlinks-1-2">
     <result-code>conflicting-attributes</result-code>
    </bm:fault-information>
   </detail>
  </env: Fault>
 </env: body>
</env: Envelope>
```

FIG. 9

```
<env:Envelope xmlns:env="http://www.w3.org/2001/12/soap-envelope"
        env:encodingStyle="http://www.w3.org/2001/12/soap-encoding"
        xmlns:enc="http://www.w3.org/2001/12/soap-encoding">
<env:Body>
<bm:cancel_job xmlns:bm=" urn:schemas-bmlinks-jp:service:bmlinks-1-2">
<requesting-user-name>yui</requesting-user-name>
<job-id>001</job-id>
</bm:cancel_job>
</env: Body>
<env: Envelope>
```

FIG. 10

```
<env:Envelope xmlns:env="http://www.w3.org/2001/12/soap-envelope
    env:encodingStyle="http://www.w3.org/2001/12/soap-encoding
    xmlns:enc="http://www.w3.org/2001/12/soap-encoding">
<env:Body>
<bm:cancelJobResponse xmlns:bm=" urn:schemas-bmlinks-jp:service:bmlinks-1-2">
  <result-code>ok</result-code>
</bm:cancelJobResponse>
</env: Body>
<env: Envelope>
```

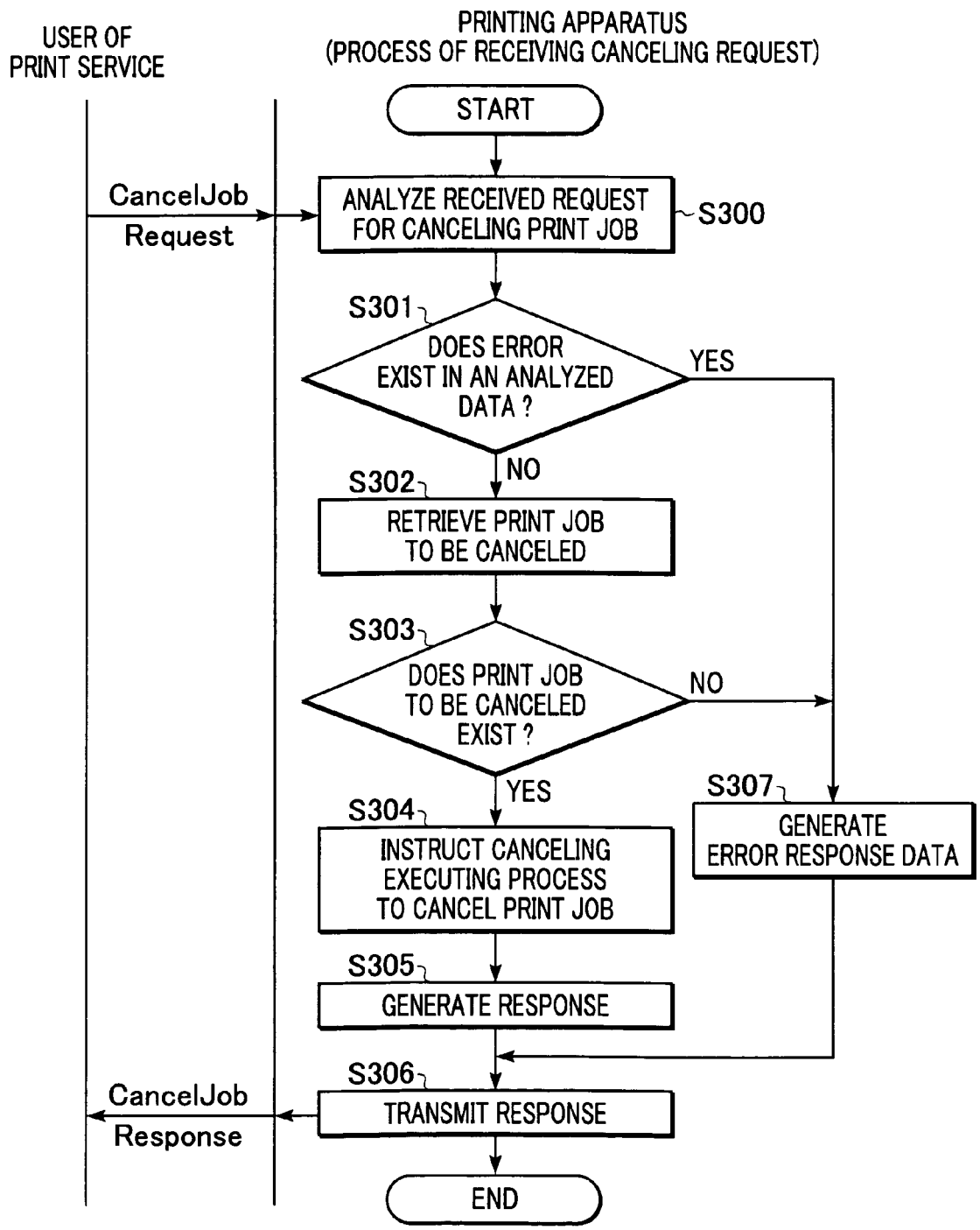

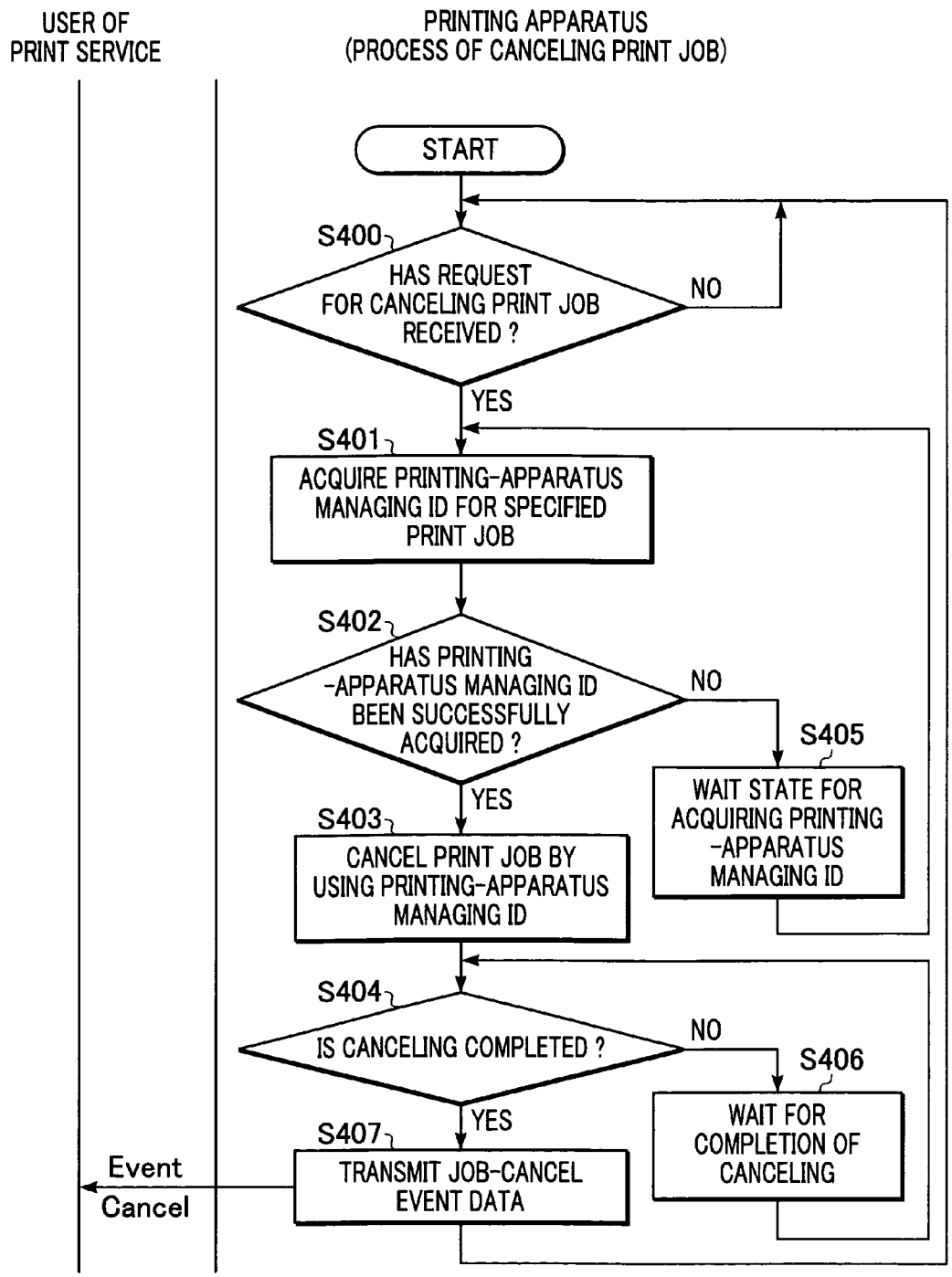

FIG. 14

```
<env:Envelope xmlns:env="http://www.w3.org/2001/12/soap-envelope"
env:encodingStyle="http://www.w3.org/2001/12/soap-encoding"
xmlns:enc="http://www.w3.org/2001/12/soap-encoding">
<env:Body>
<bm:notify xmlns:bm="urn:schemas-bmlinks-jp:service:bmlinks-1-2">
<notification>
<trigger-event>job-canceled</trigger-event>
<trigger-time>33333</trigger-time>
<notification-id>0001</notification-id>
<notification-subscription-id>1</notification-subscription-id>
<subscriber-user-name>user1</subscriber-user-name>
<job-id>0002</job-id>
<service-uri>/bmlinks/print</service-uri>
<job-name>sample-job</job-name>
<job-originating-user-name>user1</job-originating-user-name>
<job-state>canceled</job-state>
<job-state-reasons enc:arrayType="bm:job-state-reason[1]">
<job-state-reason>none</job-state-reason>
</job-state-reasons>
</notification>
</bm:notify>
</env: Body>
</env: Envelope>
```

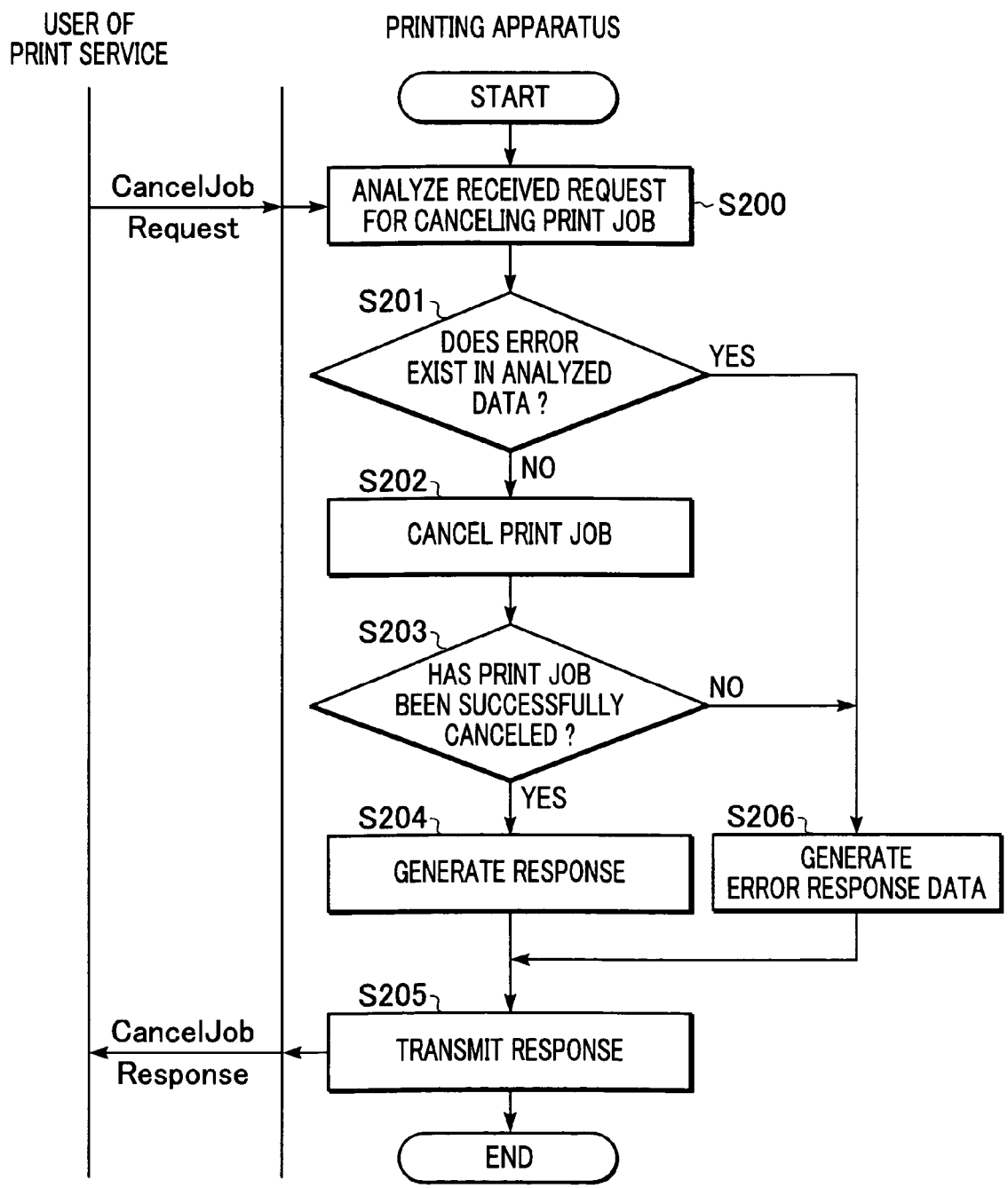

PRINTING APPARATUS AND CANCELING METHOD

BACKGROUND OF THE INVENTION

1. Field of the Invention

The present invention relates to a printing apparatus and a canceling method that process a request for canceling a print job.

2. Description of the Related Art

Hitherto, a technology is known in which jobs are transmitted by using the simple object access protocol (SOAP), which is an extensible-markup-language (XML) based communication protocol between networks, hereinafter referred to as a SOAP-XML technology. In a printing system for offering a print service by using the SOAP-XML technology, when a request for canceling a print job has been received from a host computer operated by a user of the print service, a response is transmitted from a printing apparatus to the user after the specified print job has been canceled. The process from the reception of the request for canceling the print job from the user of the print service to the transmission of the response is executed by a single process, which is a program-executing unit of the corresponding operating system (OS).

FIG. 15 illustrates a known process of canceling a print job transmitted using SOAP. When a canceling process P100a receives a request for canceling a print job from a user of the print service, the canceling process P100a requests a printer-control process group P200a to cancel the print job for which the request for canceling the print job is submitted. The printer-control process group P200a cancels the print job for which the request for canceling the print job is submitted, and notifies the canceling process P100a that the canceling has been executed.

After receiving the notification, the canceling process P100a transmits a response to the request for canceling the print job to the user of the print service. When an event transmitting process P300a receives a job-cancel event from the printer-control process group P200a, the event transmitting process P300a transmits the job-cancel event to a specified destination, if the destination is specified in the received job-cancel event.

FIG. 16 is a flowchart showing a process of canceling a print job in a known printing apparatus. When a request for canceling a print job has been transmitted from a host computer operated by a user of the print service to the printing apparatus, in Step S200, the printing apparatus analyzes XML data in the request for canceling the print job. In Step S201, the printing apparatus determines whether an error exists in the XML data analyzed in Step S200.

If the printing apparatus determines that no error exists in the XML data, in Step S202, the printing apparatus cancels the print job. In Step S203, the printing apparatus determines whether the print job is successfully canceled. If the printing apparatus determines that the print job is successfully canceled, in Step S204, the printing apparatus generates XML response data in response to the request for canceling the print job (refer to FIG. 10). In Step S205, the printing apparatus transmits the generated response data to the user of the print service.

If the printing apparatus determines in Step S201 that an error exists in the XML data in the request for canceling the print job, or if an error occurs in Step S203 (e.g., the print job has not successfully canceled), then in Step S206, the printing apparatus generates XML error response data. Then, in Step S205, the printing apparatus transmits the generated error response data to the user.

A printing system is known in which dummy print data having a cancel flag is transmitted to a printer when a user instructs the printing system to cancel a print job during the transmission of the print data in the print job (e.g., refer to Japanese Unexamined Patent Application Publication No. 2000-311069). With such a printing system, issuing the canceling instruction only once can delete the print data that has already been transmitted to the printer or can stop printing of the print data, thus reducing the burden on the user involving canceling of the print job. Furthermore, after the first canceling instruction has been issued, it is possible to actually delete the print data in the printer or to rapidly stop printing of the print data.

However, in the printing system offering a print service by using the SOAP-XML technology described above, when a request for canceling a print job has been submitted from a user, the notification of the canceling is transmitted to the user after the print job has been canceled. Hence, when the canceling process requires a long time, a network connection to the user can be broken due to timeout before the printing apparatus transmits a response to the request for canceling a print job to the user. In such a case, the user cannot be notified of the reception of the request for canceling a print job in the printing apparatus.

In addition, when it takes a long time for the printing apparatus to transmit a response to the request for canceling a print job, it is often the case that the user is unsure whether the print job was canceled, even without the network connection being broken. The same is true for the printing system disclosed in the above publication.

SUMMARY OF THE INVENTION

It is an object of the present invention to provide a printing apparatus and a canceling method in which a user of a print service can rapidly receive a response to a request for canceling a print job. It is another object of the present invention to provide a printing apparatus and a canceling method having a higher processing speed.

The present invention provides, in its first aspect, a printing apparatus that processes a print job. The printing apparatus includes a receiving unit, a responding unit, and a transmitting unit. The receiving unit receives a request for canceling the print job from an information processing system. The responding unit transmits response information, in a response to the request for canceling the print job received by the receiving unit, to the information processing system. The response information indicates that the request for canceling the print job has been received. The transmitting unit transmits information, after the print job has been canceled in accordance with the request for canceling the print job received by the receiving unit, to the information processing system. The information to be transmitted indicates that the print job has been canceled.

The present invention provides, in its second aspect, a canceling method of canceling a print job in a printing apparatus. The canceling method includes an instruction step of transmitting a request for canceling the print job from an information processing system to the printing apparatus; a receiving step of receiving, by the printing apparatus, the request for canceling the print job transmitted from the information processing system; and a responding step of transmitting response information to the information processing system. The response information indicates that the request for canceling the print job has been received. The response information is a response to the request for canceling the print job.

The response information is transmitted before the print is canceled in accordance with the request for canceling the print job.

Further objects, features and advantages of the present invention will become apparent from the following description of the preferred embodiments with reference to the attached drawings.

BRIEF DESCRIPTION OF THE DRAWINGS

FIG. 4 shows a request for creating a print job.

FIG. 5 shows response data to the request for creating a print job.

FIG. 6 shows transmitted packets of print data in an HTTP POST method, which is a communication protocol.

FIG. 7 shows response data indicating that the print data has been successfully received.

FIG. 8 shows error response data.

FIG. 9 shows a request for canceling a print job.

FIG. 10 shows response data in response to the request for canceling a print job.

FIG. 12 is a flowchart showing a process of receiving a canceling request, which is a process executed by the printing apparatus to cancel a print job.

FIG. 13 is a flowchart showing a process of canceling a print job, which is a process executed by the printing apparatus to cancel a print job.

FIG. 14 shows job-cancel event data.

FIG. 16 is a flowchart showing a process of canceling a print job in a known printing apparatus.

DESCRIPTION OF THE PREFERRED EMBODIMENTS

Embodiments of the present invention will be described below with reference to the attached drawings.
(Structure of Printing System)

Figure 1:
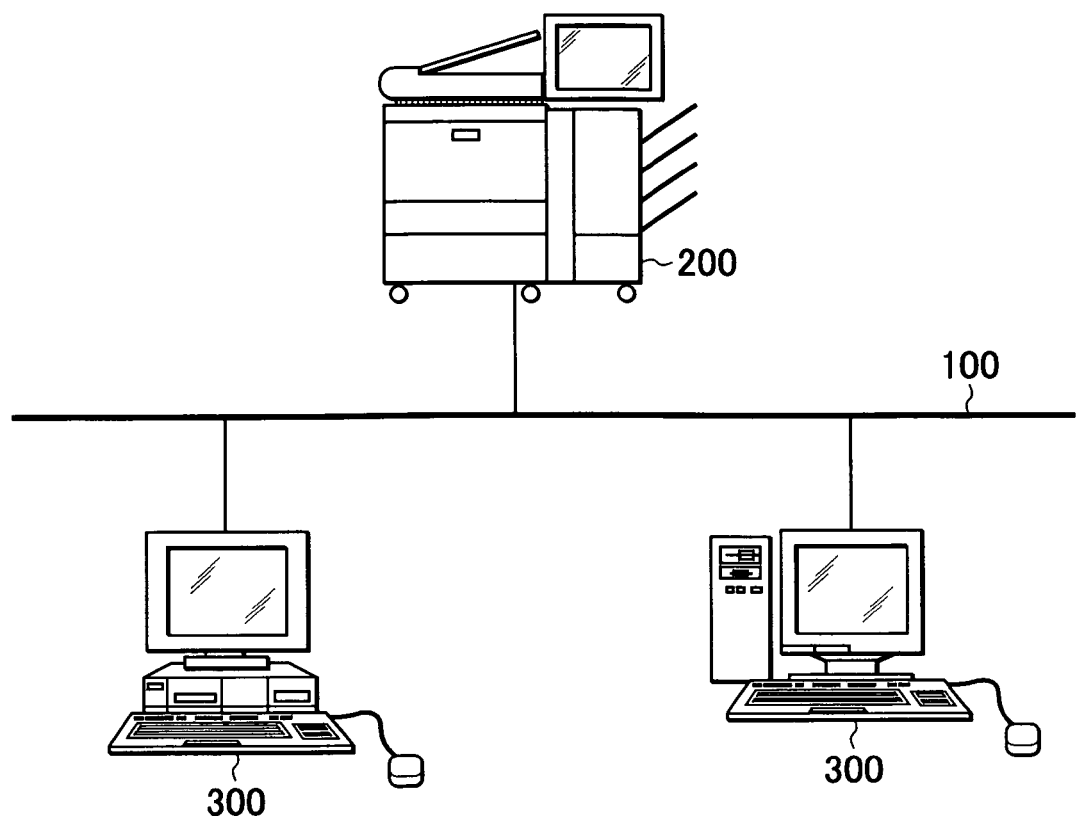
FIG. 1 illustrates the structure of a printing system according to an embodiment of the present invention.

FIG. 1 illustrates the structure of a printing system according to an embodiment of the present invention. The printing system offers a print service by using SOAP, which, as previously described, is an XML-based communication protocol. The printing system has a structure in which a printing apparatus 200 is connected to host computers (clients) 300, which are operated by users of the printing system, over a network 100.
(Structure of Printing Apparatus)

Figure 2:
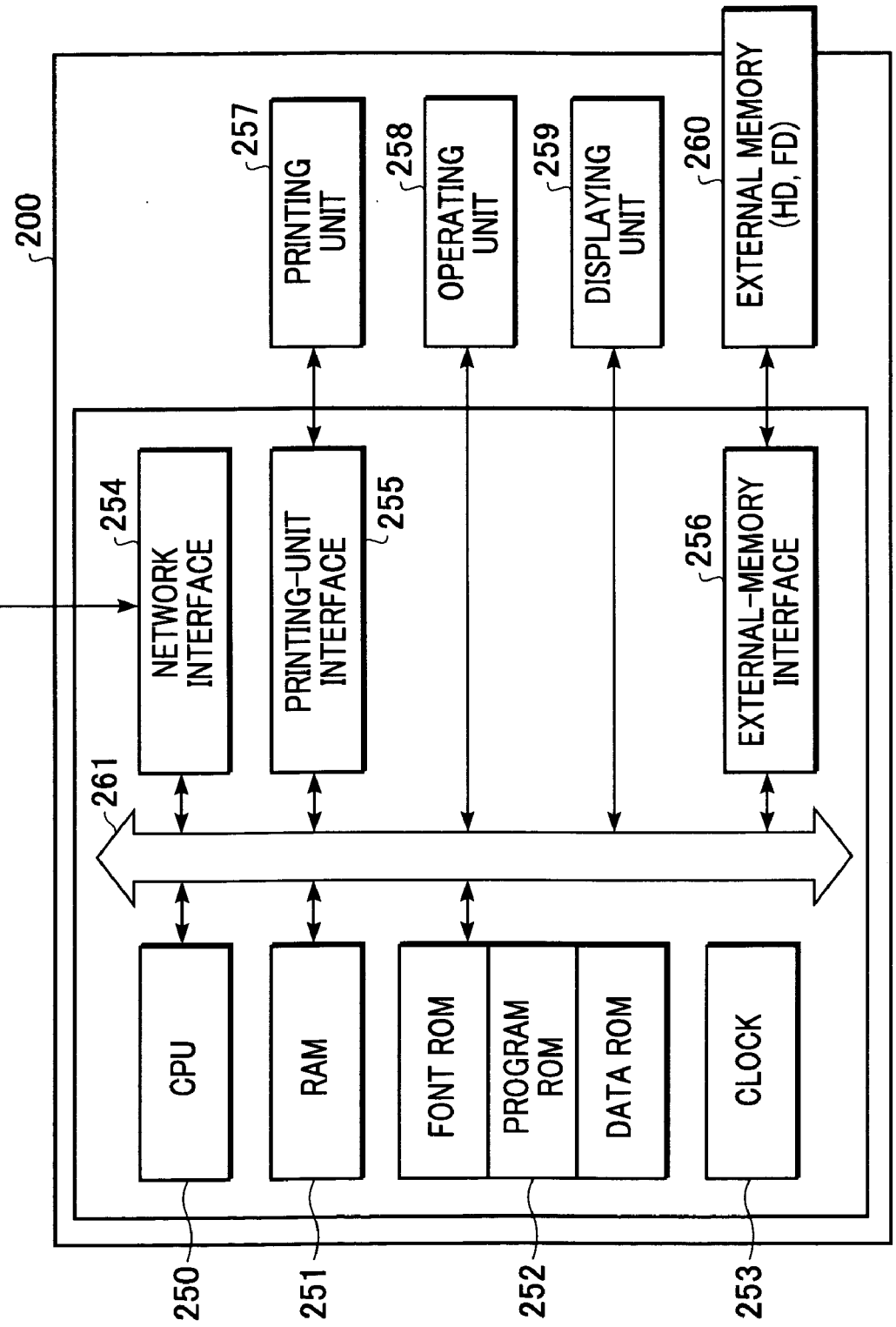
FIG. 2 is a block diagram showing the structure of a printing apparatus.

FIG. 2 is a block diagram showing the structure of the printing apparatus 200. Referring to FIG. 2, a CPU 250 controls other units in the printing apparatus 200. The CPU 250 outputs output information, that is, image signals, to a printing unit (printer engine) 257 through a printing-unit interface 255. The printing-unit 255 and the CPU 250 are connected via a system bus 261. Information is outputted by the CPU 250 based on a control program stored in a program ROM allocated in a ROM 252, or on a control program stored in an external memory 260 like a hard drive or floppy disk.

A font ROM allocated in the ROM 252 stores font data used for generating the output information. A data ROM allocated in the ROM 252 stores information to be used in the clients 300 and the like when the printing apparatus 200 does not have the external memory 260.

The CPU 250 is connected to the network 100 through a network interface 254. The network interface 254 is used to communicate with the clients 300, such as transmitting information in the printing apparatus 200 to the clients 300.

A RAM 251 preferably serves as a main memory or a work area. The memory space in the RAM 251 can be expanded with an optional RAM connected to an expansion port (not shown). The RAM 251 includes a non-volatile random access memory (NVRAM). An output-information expansion area (not shown), an environmental-data storage (not shown), and the like are allocated in the RAM 251.

Access to the external memory 260, which is a hard disk (HD), floppy disk (FD), IC card, or the like, is controlled through an external-memory interface 256. The external memory 260 stores font data, an emulation program, form data, and so on. In addition, the external memory 260 also includes an optional font card, a program for translating a printer control language into another language, and so on. The external memory 260 has an NVRAM in which printing-apparatus mode-setting information supplied from an operation panel (operating unit) 258 may be stored. At least one external memory 260 is connected to the printing apparatus 200.

The operation panel 258 has operating switches, an LED display, and the like provided thereon. A displaying unit 259 displays a variety of information to the users of the print service. A clock 253 is used for determining whether an electronic certificate has expired. Instead of providing a clock 253, a clock function may be included in the ROM 252, or a device having a clock function may be provided outside the printing apparatus 200.
(Printing Process)

Figures 3A, 3B:
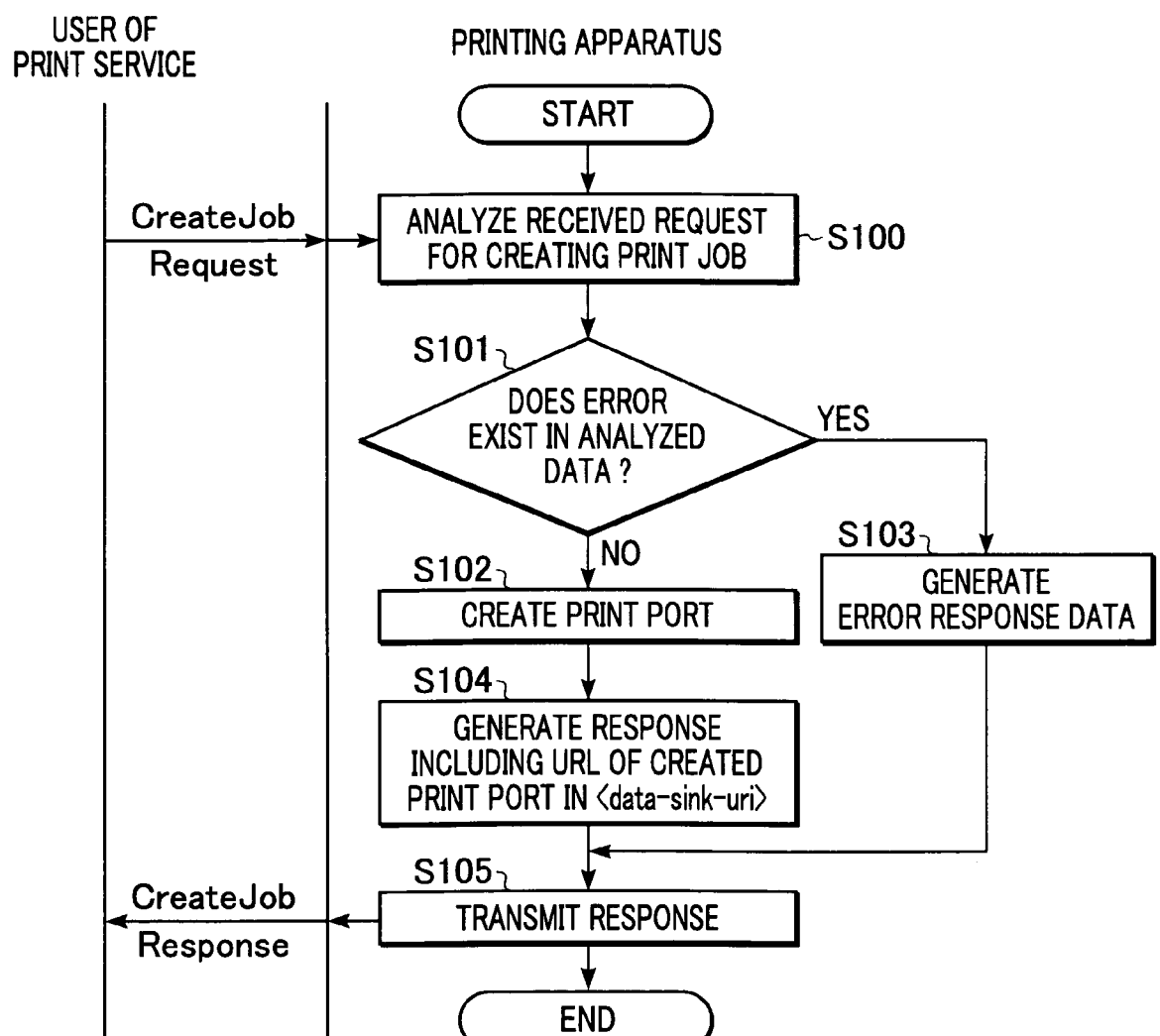
FIGS. 3A and 3B are flowcharts showing a printing-operation process of the printing apparatus when a user of a print service requests printing.

FIGS. 3A and 3B are flowcharts showing a printing-operation process of the printing apparatus 200 when a user of the print service requests printing. As described above, the program for this process, which is executed by the CPU 250, is stored in the program ROM allocated in the ROM 252 in the printing apparatus 200 or in the external memory 260.

When a request for creating a print job (Create Job Request) has been transmitted from the user of the print service (a client) to the printing apparatus 200, in Step S100, the printing apparatus 200 analyzes XML data in the request for creating a print job (Create Job Request). FIG. 4 depicts an example of a request for creating a print job (Create Job Request), which is described in more detail below. Returning to FIG. 3A, in Step S101, the printing apparatus 200 determines whether an error exists in the XML data analyzed in Step S100. If the printing apparatus 200 determines that no error exists in the XML data, in Step S102, the printing apparatus 200 creates a print port for receiving print data.

In S104, the printing apparatus 200 generates XML response data (Create Job Response) in response to the request for creating a print job (Create Job Request). The uniform resource identifier (URI) of the print port for receiving print data is set as the value of a <data-sink-uri> tag. FIG. 5 depicts an example of the response data (Create Job Response), which is described in more detail below, created in response to the request for creating a print job (Create Job Request). The XML data in FIG. 5 has the URI (http://192.168.1.4/job001) of the print port for receiving print data embedded therein.

Returning to FIG. 3A, after the printing apparatus 200 has generated the response data (Create Job Response) in response to the request for creating a print job (Create Job Request), in Step S105, the printing apparatus 200 transmits the response data to the client 300 of the user using SOAP. The client 300, operated by the user of the print service, identifies a destination based on the URI specified in the <data-sink-uri> tag shown in FIG. 5, and transmits the print data to the identified destination by using an HTTP POST method, wherein HTTP is a communication protocol. FIG. 6 depicts an example of packets of the print data transmitted via the HTTP POST method. The transmitted packets of the print data are described in more detail below.

Turning to FIG. 3B, in Step S106, the printing apparatus 200 receives the print data that has arrived at the print port. The printing apparatus 200 then prints the print data in the printing unit 257 while performing an appropriate process. After receiving the print data over the network 100, the printing apparatus 200 allocates a printing-apparatus managing identification (ID) corresponding to the print data in order to manage the print data. After the print data has been successfully received in Step S106, in Step S107, the printing apparatus 200 transmits response data (HTTP POST Response) to the user of the print service, indicating that the print data has been successfully received. The printing apparatus 200 then closes the print port and terminates the printing-operation process. FIG. 7 depicts an example of the response data (HTTP POST Response) indicating that the print data has been successfully received. The response data (HTTP POST Response) will be described in detail below.

Returning to FIG. 3A, if the printing apparatus 200 determines in Step S101 that an error exists in the XML data in the request for creating a print job (Create Job Request), then in Step S103, the printing apparatus 200 generates error response data. Next, in Step S105, the printing apparatus 200 transmits the error response data. FIG. 8 depicts an example of the error response data. The error response data will be described in detail below. After the error response data has been transmitted to the client 300 of the user of the print service in Step S105, the client 300 stops transmitting the print data.

(Request for Creating Print Job)

The request for creating a print job (Create Job Request) shown in FIG. 4 is XML packet data transmitted from the client 300 to the printing apparatus 200 by using SOAP over HTTP, and includes commands to instruct the printing apparatus 200 to start the print job.

The request for creating a print job (Create Job Request) describes information including a requesting user name (<requesting-user-name> tag) and an instruction on the processing of a job (<job-instruction> tag). The <job-instruction> tag includes job instruction information such as a <copies> tag describing the number of copies, a <sides> tag describing two-sided printing, and a <finishing> tag describing print finishing. The printing apparatus 200 processes the print job based on the values set in these tags. The <job-instruction> tag may optionally include a <notification-instruction> tag describing notification information for the print job. Referring to FIG. 4, a <notification-recipient> tag describing a notification recipient and an <event> tag describing a notification condition are shown as the notification information. The printing apparatus 200 transmits an event based on the values set in these tags.

(Response to Request for Creating Print Job)

The response data (Create Job Response) created in response to the request for creating a print job (Create Job Request) shown in FIG. 5 is data generated when the print request has been successfully received. The response data (Create Job Response) is written in XML and is transmitted by using SOAP over HTTP, like the request for creating a print job (Create Job Request). The response data (Create Job Response) includes information such as a result code for a Create Job command (<result-code> tag), an identifier of the created job (<job-id> tag), and a URI of the print port (<data-sink-uri> tag). As described above, "http://192.168.1.4/job001" is shown as the URI of the print port in FIG. 5.

(Transmission of Print Data)

The transmitted packets of the print data received in Step S106 are shown in FIG. 6. The print data is transmitted as a body by using the HTTP POST method.

(Response Data Indicating Reception of Print Data)

The response data (HTTP POST Response) indicating that the print data has been successfully received, which is transmitted in Step S107, is shown in FIG. 7. The response data (HTTP POST Response) describes closing of the connection after the print data has been received.

(Error Response Data)

The error response data generated in Step S103 when an error exists in the print request is shown in FIG. 8. The error response data is written in XML and is transmitted by using SOAP over HTTP, like the request for creating a print job (Create Job Request). The error response data complies with a format for returning a SOAP error defined in SOAP 1.1. Referring to FIG. 8, the value of a <result-code> tag indicates that the error is caused by "conflicting-attributes".

(Request for Canceling Print Job)

FIG. 9 shows a request for canceling a print job (Cancel Job Request). The request for canceling a print job (Cancel Job Request), which is written in XML, is transmitted from the client 300 to the printing apparatus 200 by using SOAP over HTTP. The request for canceling a print job (Cancel Job Request) includes ID information (<job-id> tag) concerning the print job to be canceled, and requests the printing apparatus 200 to cancel the print job having the job ID specified for the print service. Referring to FIG. 9, the user of the print service requests the printing apparatus 200 to cancel the print job having a job ID "001".

(Response to Request for Canceling Print Job)

FIG. 10 shows response data (Cancel Job Response) created in response to the request for canceling a print job (Cancel Job Request). The response data (Cancel Job Response), which is also written in XML, is received and transmitted by using SOAP over HTTP. The response data (Cancel Job Response) includes information concerning a result code (<result-code> tag) for the request for canceling a print job (Cancel Job Request). Referring to FIG. 10, the <result-code> tag indicates the result code "ok", indicating that the print job has been successfully canceled.

(Process of Canceling Print Job)

Figure 11:
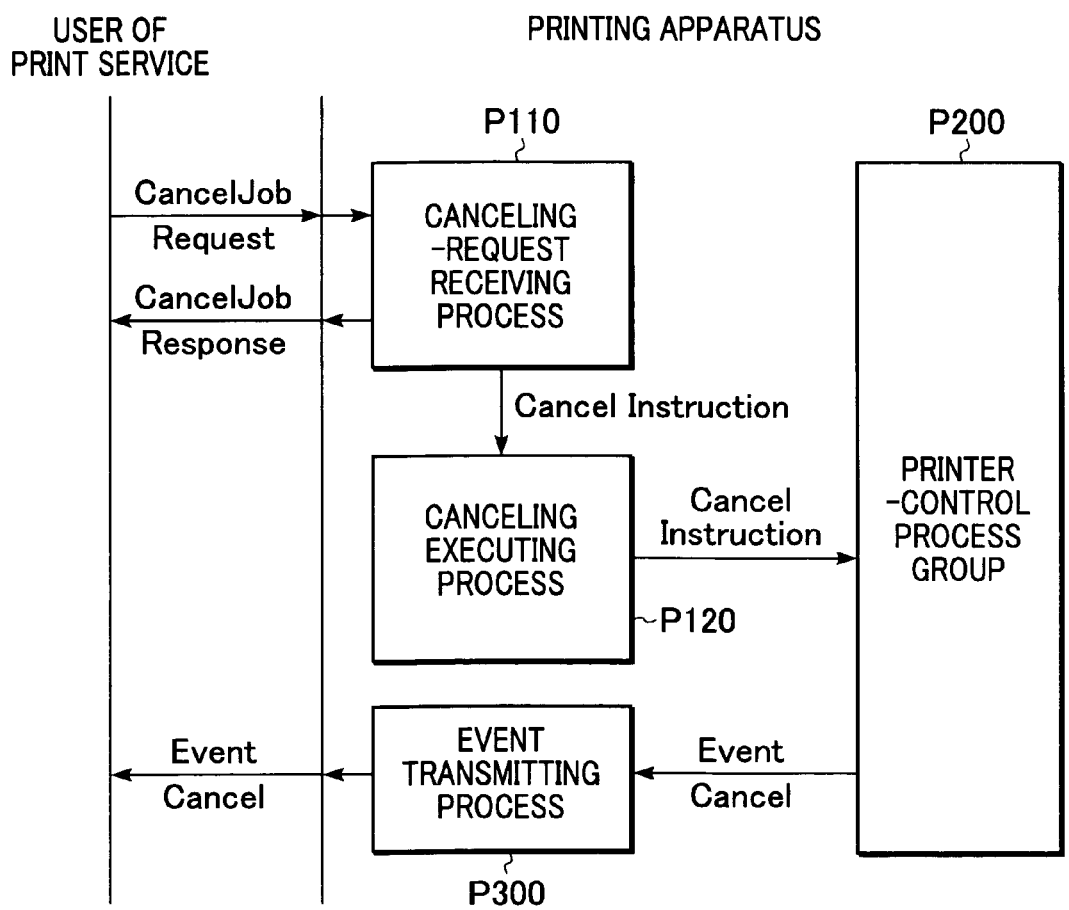
FIG. 11 illustrates a process of canceling a print job executed in the printing apparatus.
Figure 15:
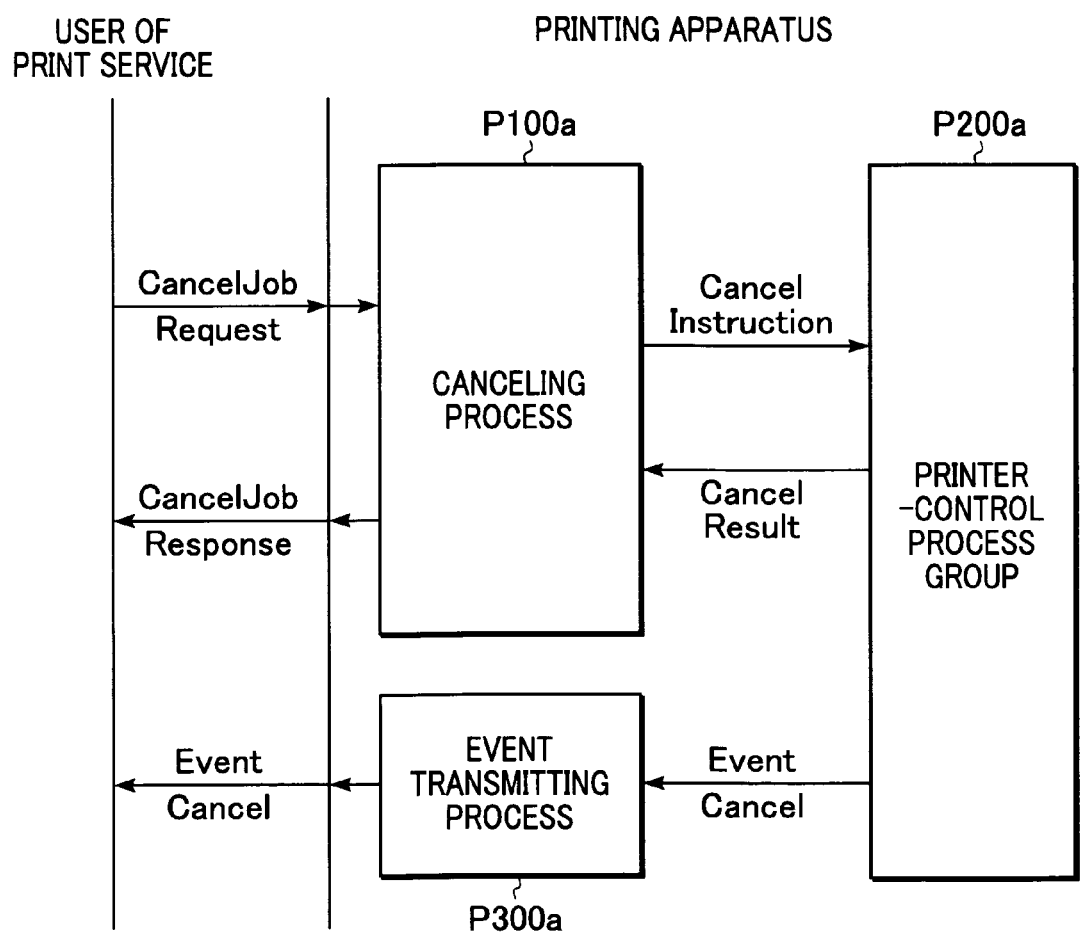
FIG. 15 illustrates a known process of canceling a print job transmitted by using SOAP.

FIG. 11 illustrates a process of canceling a print job executed in the printing apparatus 200. When a canceling-request receiving process P110 has received the request for canceling the print job (Cancel Job Request) from the client 300 operated by the user of the print service, the canceling-request receiving process P110 instructs a canceling executing process P120 to cancel the print job for which the request for canceling the print job is submitted, and returns a response to the request for canceling the print job (Cancel Job Request) to the user.

The canceling executing process P120 instructs a printer-control process group P200 to cancel the print job for which the request for canceling the print job is submitted in accordance with the instruction to cancel the print job supplied from the canceling-request receiving process P110. The printer-control process group P200 cancels the received print job. When an event transmitting process P300 has received job-cancel event data from the printer-control process group P200, the event transmitting process P300 transmits the job-cancel event data to a destination if the destination is specified in the received job-cancel event data.

(Process of Receiving Canceling Request)

FIG. 12 is a flowchart showing a process of receiving a canceling request, which is executed by the printing apparatus 200 to cancel a print job. The program of this process, which is executed by the CPU 250, is stored in the program ROM allocated in the ROM 252 in the printing apparatus 200 or in the external memory 260, as described above.

When the request for canceling a print job (Cancel Job Request), as shown in FIG. 9, has been transmitted from the client 300 operated by the user of the print service to the printing apparatus 200, in Step S300, the printing apparatus 200 analyzes XML data in the request for canceling the print job (Cancel Job Request). In Step S301, the printing apparatus 200 determines whether an error exists in the XML data analyzed in Step S300.

If the printing apparatus 200 determines that no error exists in the XML data, in Step S302, the printing apparatus 200 retrieves a print job corresponding to a job identifier specified in the request for canceling the print job (Cancel Job Request) from among a plurality of print jobs managed by the printing apparatus 200. In Step S303, the printing apparatus 200 determines whether the print job for which the request for canceling the print job is submitted exists. If the print job for which the request for canceling the print job is submitted exists, in Step S304, the printing apparatus 200 instructs the canceling executing process P120 to cancel the print job.

In Step S305, the printing apparatus 200 generates XML response data, as shown in FIG. 10, in response to the request for canceling the print job (Cancel Job Request). In Step S306, the printing apparatus 200 transmits the generated response data to the client 300 operated by the user of the print service, and terminates the process of receiving a canceling request.

If the printing apparatus 200 determines in Step S301 that an error exists in the XML data in the request for canceling the print job (Cancel Job Request), or if the printing apparatus 200 determines in Step S303 that the print job for which the request for canceling the print job is submitted does not exist, then in Step S307, the printing apparatus 200 generates error response data. Next, in Step S306, the printing apparatus 200 transmits the generated error response data to the client 300 operated by the user of the print service.

(Process of Canceling Print Job)

FIG. 13 is a flowchart showing a process of canceling a print job, which is executed by the printing apparatus 200 to cancel a print job. The program of this process, which is executed by the CPU 250, is stored in the program ROM allocated in the ROM 252 in the printing apparatus 200 or in the external memory 260, as described above.

In Step S400, the printing apparatus 200 waits for a request for canceling a print job that is received from the canceling-request receiving process P110. After the request for canceling the print job has been received, in Step S401, the printing apparatus 200 acquires a printing-apparatus managing ID corresponding to the print job for which the request for canceling the print job is submitted. The printing-apparatus managing ID is used by the printing apparatus 200 to manage the print job. In Step S402, the printing apparatus 200 determines whether the printing-apparatus managing ID has been successfully acquired. If the printing apparatus 200 determines that the printing-apparatus managing ID has not been acquired, in Step S405, the printing apparatus 200 proceeds to a wait state and waits for acquiring the printing-apparatus managing ID. Once a printing-apparatus ID is acquired, the process returns to Step S401.

If the printing apparatus 200 determines in Step S402 that the printing-apparatus managing ID has been successfully acquired, in Step S403, the printing apparatus 200 cancels the print job by using the printing-apparatus managing ID. In Step S404, the printing apparatus 200 determines whether the canceling is completed. If the canceling is not completed, in Step S406, the printing apparatus 200 waits for the completion of canceling the print job. The printing apparatus 200 repeats Steps S404 and S406 until cancellation of the print job has been completed. If the canceling is completed, in Step S407, the printing apparatus 200 transmits job-cancel event data. The printing apparatus 200 then returns to a wait state and waits for a request for canceling a print job.

(Notification of Completion of Canceling)

FIG. 14 shows the job-cancel event data for notifying that the print job has been canceled. The job-cancel event data to be transmitted to the client 300, which is the host computer, is written in XML, and is transmitted by using SOAP. The destination of the job-cancel event data is the URL described in the <notification-recipient> tag in FIG. 4. Hence, the job-cancel event data can be transmitted not only to the user who has submitted the request for canceling the print job, but also to a predetermined destination. The value of a <trigger-event> tag in FIG. 14 is set to "job-canceled", indicating that the corresponding data notifies the completion of the canceling.

According to the printing system of this embodiment, when the printing apparatus 200 has received the request for canceling the print job, the printing apparatus 200 determines whether the specified print job can be canceled, and transmits the determined result to the user of the print service before executing the canceling of the print job. The print job is canceled in a process other than the process that has received the request for canceling the print job. After the print job has been canceled, the printing apparatus 200 establishes a new connection to a predetermined destination, and transmits a notification of the completion of canceling the print job through the connection. Accordingly, the user can rapidly receive a response to the request for canceling the print job, thus increasing the processing speed. Furthermore, the user can receive from the printing apparatus 200 the notification of the completion of canceling the print job for which the request for canceling a print job is submitted. Therefore, the user can be informed whether the print job has been successfully canceled.

The present invention is not limited to the structure and method according to the embodiments described above. Any structure and method can be applied to the present invention as long as the claimed functions or the functions of the structure or method of the embodiments can be realized.

For example, the request for canceling a print job is managed by the printing apparatus in the embodiments described above. However, if a network-connecting device, provided between the clients and the printing apparatus, manages a print job transmitted from the client, canceling of the print job transmitted from the client may be included in the request for canceling a print job.

The object of the present invention can also be accomplished by providing a storage medium for storing program code of software that realizes the functions of the above embodiments in a printing system or in a printing apparatus, the computer (or the CPU, the MPU, or the like) of which reads out and executes . . . the program code stored in the storage medium.

In this case, the program code itself read out from the storage medium realizes the functions of the embodiments described above. The storage medium having the program code stored therein constitutes the present invention.

Storage media for storing the program code includes, but they are not limited to, a floppy disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM.

The computer that executes the read program code realizes the functions of the embodiment described above. In addition, the operating system (OS) or the like run on the computer may execute all or part of the actual processing based on the instructions in the program code to realize the functions of the embodiments described above.

Alternatively, after the program code read out from the storage medium has been written in a memory that is provided in an expansion board included in the computer or in an expansion unit connected to the computer, the CPU or the like in the expansion board or the expansion unit may execute all or part of the actual processing based on the instructions in the program code to realize the functions of the embodiments described above.

According to the present invention, the user of the print service can rapidly receive a response to the request for canceling a print job, and an increase in the processing speed can be expected.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing apparatus that processes a print job from an information processing system, the printing apparatus comprising:
    a print-job request receiving unit configured to receive, from the information processing system, a request for processing a print job and a notification destination of event information indicating an event relating to the print job;
    a job-identifier transmitting unit configured to transmit a job identifier corresponding to the print job to the information processing system in accordance with the request received by the print-job request receiving unit;
    a print-data receiving unit configured to receive print data corresponding to the print job from the information processing system after the job identifier has been transmitted by the job-identifier transmitting unit;
    a request receiving unit configured to receive, from the information processing system, a cancellation request for canceling a print job;
    a retrieving unit configured to retrieve the print job corresponding to a job identifier specified by the cancellation request received by the receiving unit;
    a responding unit configured to transmit, in response to the request receiving unit receiving the cancellation request and the corresponding print job being retrieved by the retrieving unit, to the information processing system, before cancellation of the corresponding print job is completed and as a response to the cancellation request received by the request receiving unit, response information indicating that a result of the cancellation request is success, and to transmit, in response to the request receiving unit receiving the cancellation request and the corresponding print job not being retrieved by the retrieving unit, to the information processing system, response information indicating that a result of the cancellation request is an error; and
    a transmitting unit configured to transmit, in response to the corresponding print job being canceled in accordance with the cancellation request received by the request receiving unit, to the notification destination, event information indicating that the print job has been canceled.

2. A printing apparatus according to claim 1, wherein, in response to the corresponding print job being retrieved by the retrieving unit, the responding unit transmits to the information processing system the response information indicating that the result of the cancellation request is the success.

3. A printing apparatus according to claim 1, further comprising:
    an acquiring unit configured to acquire identification information of the print job corresponding to the job identifier specified in the cancellation request received by the request receiving unit, the identification information being associated with the print job in order for the printing apparatus to manage the print job; and
    a canceling unit configured to cancel the print job based on the identification information acquired by the acquiring unit.

4. A printing apparatus according to claim 1, wherein the transmitting unit establishes a new connection to the notification destination and then transmits the event information via the new connection.

5. A method of canceling a print job in a printing apparatus that processes a print job from an information processing system, the method comprising:
    receiving, from the information processing system, a request for processing a print job and a notification destination of event information indicating an event relating to the print job;
    transmitting a job identifier corresponding to the print job to the information processing system in accordance with the received request;
    receiving print data corresponding to the print job from the information processing system after the job identifier has been transmitted;
    receiving, from the information processing system, a cancellation request for canceling a print job;
    retrieving the print job corresponding to a job identifier specified by the received cancellation request;
    transmitting, in response to receiving the cancellation request and retrieving the corresponding print job, to the information processing system, before cancellation of the corresponding print job is completed and as a response to the received cancellation request, response information indicating that a result of the cancellation request is success, and transmitting, in response to receiving the cancellation request and not retrieving the corresponding print job, to the information processing system, as a response to the received cancellation request, response information indicating that a result of the cancellation request is an error; and
    transmitting, in response to the corresponding print job being canceled in accordance with the received cancellation request, to the notification destination, event information indicating that the print job has been canceled.

6. A method according to claim 5,
wherein, in response to the corresponding print job being retrieved, transmitting includes transmitting to the information processing system the response information indicating that the result of the cancellation request is the success.

7. A method according to claim 5, further comprising:
acquiring identification information of the print job corresponding to the job identifier specified in the received cancellation request, the identification information being associated with the print job in order for the printing apparatus to manage the print job; and
canceling the print job based on the acquired identification information.

8. A printing apparatus that processes a print job from an information processing system, the printing apparatus comprising:
a print-job request receiving unit configured to receive, from the information processing system, a request for processing a print job and a notification destination of event information indicating an event relating to the print job;
a job-identifier transmitting unit configured to transmit a job identifier corresponding to the print job to the information processing system in accordance with the request received by the print-job request receiving unit;
a print-data receiving unit configured to receive print data corresponding to the print job from the information processing system after the job identifier has been transmitted by the job-identifier transmitting unit;
a request receiving unit configured to receive, from the information processing system, a cancellation request for canceling a print job;
a retrieving unit configured to retrieve the print job corresponding to a job identifier specified by the cancellation request received by the request receiving unit;
a responding unit configured to transmit, in response to the corresponding print job being retrieved by the retrieving unit, to the information processing system, before cancellation of the corresponding print job is completed, response information indicating that a result of the cancellation request is success, and transmit, in response to the corresponding print job not being retrieved by the retrieving unit, to the information processing system, response information indicating that a result of the cancellation request is an error; and
a transmitting unit configured to transmit, in response to the corresponding print job being canceled in accordance with the cancellation request received by the request receiving unit, to the notification destination, event information indicating that the print job has been canceled.

9. A printing apparatus according to claim 8, wherein the transmitting unit establishes a new connection to the notification destination and then transmits the event information via the new connection.

* * * * *